Figure 1:
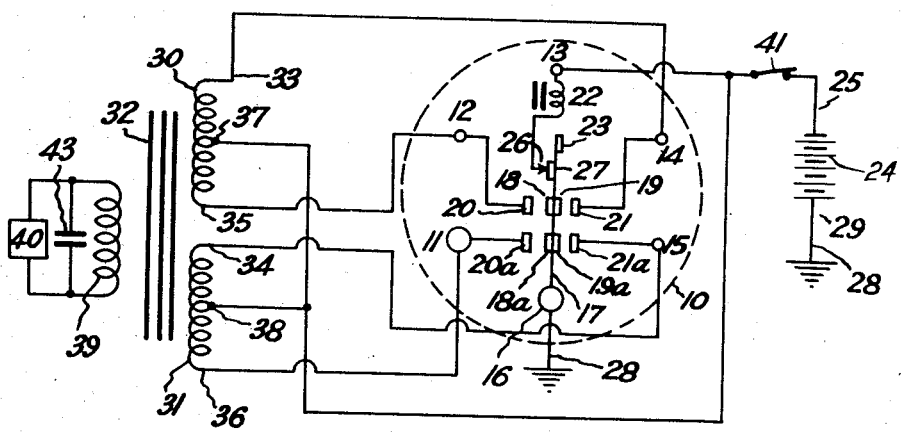

July 7, 1959

R. F. J. FLOOD 2,894,194

ELECTRICAL POWER SUPPLY SYSTEMS

Filed Aug. 30, 1954

INVENTOR,
REGINALD FRANCIS JOSEPH FLOOD
by Mead, Browne, Schuyler & Beveridge,
ATTORNEYS

United States Patent Office 2,894,194
Patented July 7, 1959

2,894,194
ELECTRICAL POWER SUPPLY SYSTEMS

Reginald Francis Joseph Flood, Blakehurst, near Sydney, New South Wales, Australia, assignor to Amalgamated Wireless (Australasia) Limited, Sydney, New South Wales, Australia, a corporation of New South Wales Application August 30, 1954, Serial No. 453,011

Claims priority, application Australia October 28, 1953

6 Claims. (Cl. 321—2)

The present invention relates to electrical power supply systems and more particularly to electrical power supply systems which employ electrical vibrators of the non-synchronous or interrupter type.

Power supply systems of this type are well known in connection with radio receivers and like apparatus, particularly for use in automobiles and in localities where the power supply is limited to a low voltage battery. In systems of this nature are primary D.C. voltage—usually of low value—is interrupted by an electromagnetic interrupter, comprising a vibratory armature, to produce an A.C. voltage. This A.C. voltage is then stepped up by a transformer, the high voltage secondary of which is connected to a separate rectifier which in conjunction with its associated filter network supplies a high tension voltage dependent on the transformer turns ratio.

In the past the electrical requirements of the components employed in the system have been determined by the value of the voltage available from the primary source. For example, where the primary source consists of a 6-volt battery, an interrupter with a 6-volt driving winding and a vibrator transformer with 6-volt primary windings must be used.

If the primary source has a voltage value of 12 volts it will be necessary to use an interrupter with a 12-volt driving winding and a vibrator transformer with 12-volt primary windings. The electrical characteristics of the interrupter and its associated transformer must therefore be selected with due regard to the voltage of the primary source available.

From the foregoing it will be seen that if a system which is designed to operate from a 6-volt primary source is required to operate from a 12-volt primary source, it will be necessary to change the interrupter and the associated transformer for similar components which are electrically suitable for the 12-volt primary supply.

When radio apparatus is installed in automobiles, the electrical power supply system for use with the equipment must be designed to operate from the primary source available on the particular automobile to be equipped. As the primary source of voltage available on automobiles is at present either 6 or 12 volts, 6 or 12 volt power supply units respectively must be used to comply with these requirements.

It will be readily appreciated that in order to meet demands for electrical power supply units where the voltage of the primary source is not previously known, it is necessary to have available both 6 and 12 volt units. This is not a very economical proposition, for it means that in order to meet a demand of say, 50 units for operation with primary sources of unknown value, but which may be either 6 or 12 volts, 100 units consisting of 50 6-volt and 50 12-volt types must be kept available.

Furthermore, where a fleet of vehicles with a mixture of 6-volt and 12-volt primary sources are fitted with radio apparatus, it is very inconvenient from a servicing point of view not to be able to interchange the equipment without regard to the voltage of the primary sources.

The object of the present invention is to provide an electrical power supply system of the electrical vibrator or interrupter type which is readily adaptable for operation from primary voltage supply sources of 6 or 12 volts without changing the component parts.

The above object is achieved in an improved electrical power supply system which, in accordance with the present invention, comprises in combination an electrical vibrator of the dual interrupter type adapted for operation from a 6-volt supply source, an associated vibrator transformer having two separate centre tapped primary windings and a high voltage secondary winding, a driving winding for operating the vibrating member of said interrupter, means for connecting said primary windings in parallel and to said interrupter for operation off a 6-volt supply source, means for intermittently connecting said driving coil to said 6-volt supply source, means for connecting said primary windings in series and to said interrupter for operation off a 12-volt supply source, means for intermittently connecting said driving coil to the low potential centre tap of one of said primary windings and means for rectifying the potentials developed across said secondary winding.

For a more complete understanding of the invention and the manner in which it is to be carried out, attention is now directed to the following description in connection with the accompanying drawings in which—

Figure 2:
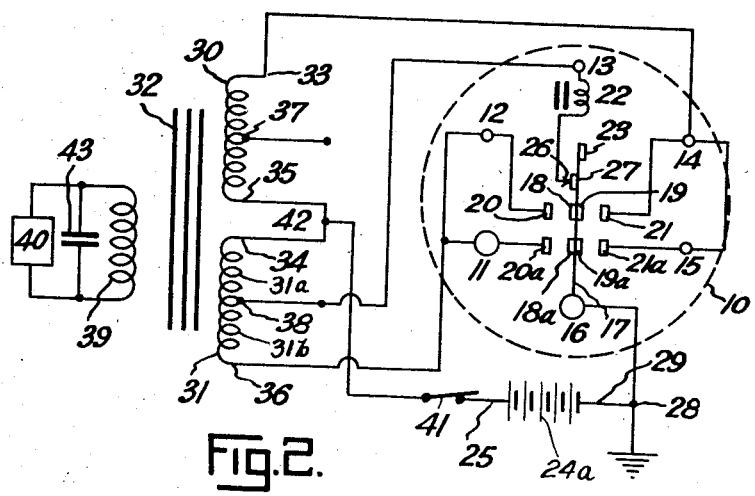

Fig. 1 illustrates a conventional electrical power supply system employing an electric vibrator of the dual interrupter type designed to operate off a 6-volt supply source; and Fig. 2 illustrates one practical modification of the circuit of Fig. 1 in accordance with the present invention to permit operation of the system from a 12-volt supply source.

The circuit arrangement of a conventional power supply system employing a dual interrupter type vibrator unit is illustrated in Fig. 1. The circuit arrangement and method of operation of systems of this type are well known and only that portion of the circuit which is essential for an understanding of the present invention will be described in detail.

The vibrator 10 employed in Fig. 1 functions the same as the well known non-synchronous type. It has a reed 17 which carries a pair of contacts 18, 18a and 19, 19a on either side and vibrates so as to bring the reed contacts 18, 18a and 19, 19a into alternate engagement with associated fixed contacts 20, 20a and 21, 21a respectively on either side. The provision of the dual contact system enables the vibrator 10 to operate under heavier loads than those usually recommended for the standard non-synchronous type vibrator.

The reed 17 is energised by means of a small electro-magnetic driving coil 22 which acts on a magnetic armature 23, mounted on the free end of the reed 17. The driving coil 22 is designed to operate with a 6-volt supply source 24. The coil 22 is connected to the battery 24 for the so-called separate driver system of energisation. With the separate driver system the coil 22 is operated only by the battery voltage.

The advantage claimed for the separate driver system of energisation is that the coil 22 current is not switched by the power contacts, and good starting is ensured. The energising circuit for the driving coil 22 may be traced from the positive terminal 25 of the 6-volt supply source 24 through the coil 22 to a fixed contact 26 and a cooperating contact 27, carried by the reed 17, through the reed 17 to earth 28 and the negative terminal 29 of the supply source 24.

In order to obtain better load equalisation in power supply systems of this type separate primary windings 30 and 31 for each set of contacts 18—19—20—21 and 18a—19a—20a—21a respectively are provided on the vibrator transformer 32.

The starting ends 33—34 of the primary windings 30—31 are respectively connected to the stationary contacts 21—21a on one side of the reed 17. The finishing ends 35—36 of the primary windings 30—31 are respectively connected to the stationary contacts 20—20a on the other side of the reed 17. The centre taps 37—38 of the primary windings 30—31 are connected together and to the positive terminal 25 of the supply source 24.

When energising potentials are applied to the driving coil 22 the system will function in known manner to provide an alternating potential of high value across the secondary winding 39 of the vibrator transformer 32. The high voltage alternating potential developed across the secondary winding 39 is fed to a separate rectifying system 40 of any convenient form which in conjunction with its associated filter network—not shown—supplies a high tension voltage, the value of which is dependent on the transformer turns ratio.

If it is desired to operate the system of Fig. 1 from a 12-volt supply source instead of the 6-volt source shown in the drawing, it will be necessary to substitute a 12-volt vibrator unit for the 6-volt unit 10 at present employed and also to modify the circuit connections to provide a centre tapped primary with 12-volt windings on either side of the tap.

If the circuit of Fig. 1 is modified in accordance with the present invention, the necessity for changing the vibrator unit 10 is avoided.

Such modification may be readily effected by means of a suitably connected switch which enables the system of Fig. 1 to be quickly adapted for operation from a 12-volt supply source without requiring the substitution of any of the circuit components.

One practical modification of the circuit connections of Fig. 1, in accordance with the present invention, is shown in Fig. 2.

Referring to Fig. 2 in which parts similar to those in Fig. 1 are designated by similar reference characters, it will be seen that the primary windings 30—31 are now connected in series instead of in parallel as shown in Fig. 1. The connection between the finish 35 of the winding 30 and the contact 20 of the vibrator 10, and the connection between the start 34 of the winding 31 and the vibrator contact 20a is eliminated. The finish of winding 35 is now directly connected to the start 34 of the winding 31, thereby connecting the two primary windings 30—31 in series. The connection 42 between the two primaries 30—31 constitutes the centre tap of the series connected primary windings 30—31 and is connected to the positive potential 25 of the 12-volt supply source 24a.

The stationary contacts 21—21a of the vibrator 10 are connected together, and to the starting end 33 of the winding 30; and the stationary contacts 20—20a are connected together and to the finishing end 36 of the winding 31.

The driving coil 22 for the vibrator 10 is connected to the centre tap 38 of the primary winding 31. Therefore portion 31a of coil 31 is in series with coil 22 whenever contacts 26, 27 are engaged. Portion 31b of coil 31 will be connected in parallel with coil 22 whenever contacts 18, 20 and 18a, 20a are engaged. The resistance of coil 22 is high as compared to that of coil 31. Therefore coil 22 receives practically the full voltage of battery 24a whenever contacts 26, 27 are closed. However, when contacts 18, 20 and 18a, 20a are also closed, coil 31b will serve as a shunt and coil 22 will receive relatively little current. The potential across coil 22 will then become approximately the same as in the Fig. 1 circuit, six volts. The negative terminal 29 of the supply source 24a and the reed 17 of the vibrator 10 are connected together and to earth 28 as in Fig. 1.

The driving coil 22 of the vibrator 10 is energised from the centre tap 38 of the primary winding 31 in the following manner: When the starting switch 41 is closed, the driving coil 22 is in series with one half of the primary winding 31. As the resistance of the driving coil 22 is high compared to that of the primary winding 31, the initial voltage impulse applied to the coil 22 will be equal to approximately the full voltage of the battery 24a.

However, the vibrator driving coil 22 attracts the armature 23 causing the reed 17 to move in the direction of contacts 21—21a. The winding 22 exercises an attractive force on the armature 23 sufficient to cause the reed 17 to swing to a position where contact is established between reed contacts 19—19a and fixed contacts 21—21a. In this position the end 33 of the winding 30 is connected to earth 28 and the negative terminal 29 of the battery 24a. This creates a direct path for battery current to flow through the primary winding 30.

During the above described movement of the reed 17 and prior to the engagement of reed contacts 19—19a with the fixed contacts 21—21a, the contacts 26—27 are interrupted, thereby de-energising the driving coil 22.

However, the reed 17 has sufficient momentum to keep the contacts 19—19a and contacts 21—21a closed for a time, after which the elasticity of the reed 17 causes it to swing back, thus breaking the contact engagement between contacts 19—19a and contacts 21—21a and interrupting the current flow through the winding 30.

The reed 17 has sufficient momentum in its back swing to cause it to move to a position where contact is established between reed contacts 18—18a and the fixed contacts 20—20a and to hold it in this position for a short time in opposition to the attractive forces of the driving coil 22, the driving coil 22 having been again energised by the closing of contacts 26—27 during the back swing of the reed 17. Energising potentials from the battery 24a are again applied to the coil 22 through the centre tap connection 38 on the coil 31.

The closing of reed contacts 18—18a with the fixed contacts 20—20a connects the end 36 of the winding 31 to earth 28 and the negative terminal 29 of the battery 24a.

With this connection the full potential of the battery 24a is applied across the winding 31. As the tapping 38 is taken from the centre point of the winding 31 the voltage at this point, due to the voltage drop across the winding, will be 6 volts or half the voltage of the battery.

While the contacts 18—18a are closed with the contacts 20—20a, thus earthing the end 36 of the winding 31, the correct operating potential of 6 volts will be applied to the winding 22.

The duty cycle of the contacts 18—18a in contact with the contacts 20—20a is only slightly less than the operative time of the contacts 26—27. The driving coil 22 will therefore receive the correct energising potential of 6 volts during the major portion of the operating time of the contacts 26—27.

If the contacts 26, 27 and also 18, 20 and 18a, 20a were adjusted to make and break in synchronism, the driving coil 22 would draw the same amount of current as it would when the circuit was connected as in the Fig. 1 circuit despite the higher voltage of battery 24a. This is because coil 31b serves as a shunt and draws an appreciable current thus increasing the current flow through coil 31a, and reducing the potential at center tap 38 to six volts. This arrangement prevents damage of coil 22 when 12 volt batteries are used and makes practical the use of the same vibrator unit used with 6 volt batteries.

However, synchronous operation of the contacts referred to is not essential for the successful operation of the invention. For all practical purposes it is only necessary to ensure that the contacts 26—27 are (1) made with, or slightly before, the engagement of contacts 18, 20 and 18a, 20a, (2) maintained in contact throughout the operative period of the contacts 18, 20 and 18a, 20a, and (3) open with or slightly after the opening of contacts 18, 20 and 18a, 20a.

It will be appreciated that practically the full voltage of the battery 24a will be applied to the coil 22 during any time period in which the contacts 26—27 are closed while the contacts 18, 20 and 18a, 20a are open. The operating adjustment of the contacts 26—27 and 18, 20 and 18a, 20a should therefore be such that the length of the time period in which the contacts 26—27 are closed before the closing of contacts 18, 20 and 18a, 20a, and after the opening of these contacts, is no greater than that time period in which the impedance of coils 31a and 22 prevents buildup of current flow through 22 to a value that would cause damage to the coil 22. The operation of the arrangement in Fig. 2 as described above, will be repeated continuously as long as the switch 41 remains closed.

From the foregoing description it will be seen that the novel circuit arrangement of the present invention permits a vibrator normally designed for operation from a 6-volt supply source to be operated from a 12-volt supply without substitution of component parts.

Any convenient form of switching may be employed for the purpose of changing over the circuit connections of Fig. 1 to the circuit connections shown in Fig. 2. The provision of such switching facilities will permit the power supply unit to be used as required with either 6 or 12 volt supply sources.

I claim:

1. In an electrical power supply system employing an electrical vibrator of the non-synchronous or interrupter type and normally adapted for operation by a primary direct current source of low voltage, a vibrator transformer having two primary windings and a high voltage secondary winding, said primary windings being designed for parallel energization from said source of low voltage, a driving coil for intermittently operating the vibrating member of said vibrator, and means for connecting said primary windings in series and to said vibrator to be energized alternatively by a primary direct current source of low voltage of twice the normal value, means for connecting said driving coil to the center tap of one of said primary windings to receive energizing potentials from said last mentioned source of low voltage, and means for rectifying the potentials developed across the secondary winding.

2. An electrical power supply system as claimed in claim 1, said system being characterized in that said vibrator is of the kind that has dual contacts.

3. An electrical power supply system as claimed in claim 1, said system being characterized in that said source of low voltage of twice the normal value is connected between the vibrating member of said vibrator and the junction of said two primary windings.

4. In an electrical power supply system employing an electrical vibrator of the non-synchronous or interrupter type and normally adapted for operation from a primary direct current source of six volts, a vibrator transformer having two separate center tapped primary windings and a high voltage secondary winding, said primary windings being designed for parallel energization from said six volt supply source, a driving coil comprising a six volt winding for intermittently operating the vibrating member of said vibrator, and means for connecting said primary windings in series to said vibrator to be energized alternatively by a primary direct current source of twelve volts, means for connecting said driving coil to a low potential center tap of one of said primary windings to receive energizing potentials from said twelve volt supply source, and means for rectifying the potentials developed across said secondary winding.

5. An electrical power supply system as claimed in claim 4, said system being characterized in that said vibrator is of the kind that has dual contacts.

6. An electrical power supply system as claimed in claim 4, said system being characterized in that said twelve volt supply source is connected between the vibrating member of said vibrator and the junction of said two primary windings.

References Cited in the file of this patent

UNITED STATES PATENTS

| | | |
|---|---|---|
| 2,157,417 | Kneisley | May 9, 1939 |
| 2,262,819 | Rosser | Nov. 18, 1941 |
| 2,347,165 | Aust | Apr. 25, 1944 |
| 2,745,999 | Mas | May 15, 1956 |
| 2,830,200 | Backman et al. | Apr. 8, 1958 |